(12) United States Patent
Takita et al.

(10) Patent No.: US 7,365,808 B2
(45) Date of Patent: Apr. 29, 2008

(54) ELECTRONIC DEVICE HAVING A DISPLAY

(75) Inventors: Taro Takita, Tokyo (JP); Takashi Sugaizumi, Chiba (JP); Toshiaki Sato, Tokyo (JP); Shigeaki Suzuki, Kanagawa (JP); Kazunori Takahashi, Tokyo (JP); Shoji Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 11/016,828

(22) Filed: Dec. 21, 2004

(65) Prior Publication Data

US 2005/0190309 A1 Sep. 1, 2005

(30) Foreign Application Priority Data

Jan. 7, 2004 (JP) ............................. 2004-001685
Dec. 9, 2004 (JP) ............................. 2004-356264

(51) Int. Cl.
  *H04N 5/64* (2006.01)
(52) U.S. Cl. .................................................. 348/836
(58) Field of Classification Search ................ 348/836, 348/837, 838, 843; 345/173, 175, 1.1, 177
  See application file for complete search history.

(56) References Cited

U.S. PATENT DOCUMENTS 6,118,436 A * 9/2000 Kushita ...................... 345/173
6,832,116 B1 * 12/2004 Tillgren et al. ................. 700/1
6,885,878 B1 * 4/2005 Borgstrom et al. ....... 455/556.1
6,952,497 B1 * 10/2005 Hollstrom et al. .......... 382/188
7,218,315 B2 * 5/2007 Takeuchi et al. ............ 345/204
2003/0090480 A1 5/2003 Polgar et al.

FOREIGN PATENT DOCUMENTS

JP 11-53094 2/1999
JP 2003-140565 5/2003

* cited by examiner

*Primary Examiner*—Paulos M. Natnael
(74) *Attorney, Agent, or Firm*—Oblon, Spivak, McClelland, Maier & Neustadt, P.C.

(57) ABSTRACT

An electronic device such as a portable television receiver includes a main body having a display and a frame portion provided around the display. In addition, the portable television receiver further includes a frame panel detachable to the frame portion, and on the frame portion, there is provided a frame detecting unit for detecting a type of the frame panel attached to the frame portion, so that a display position of a screen image relating to the operation on the display, or a screen image for a function of display is changed in accordance with the detected result of the frame detecting unit.

9 Claims, 6 Drawing Sheets

ELECTRONIC DEVICE HAVING A DISPLAY

CROSS REFERENCE TO RELATED APPLICATION

This application claims priority from Japanese Priority Documents No. 2004-001685, filed on Jan. 7, 2004 and No. 2004-356264, filed on Dec. 9, 2004 with the Japanese Patent Office, which documents are hereby incorporated by reference.

BACKGROUND OF THE INVENTION

1. Field of the Invention

The present invention relates to a technology for an electronic device having a display. More particularly, the present invention relates to a technology adapted to such electronic device, wherein the electronic device is equipped with a main body and a frame panel that is detachable to a frame portion of the main body in order to improve an usability of the electronic device.

2. Description of Related Art

For example, some of electronic devices such as a portable type television, a personal computer, a PDA, and the like are configured to execute various functions by operating, that is, by touching an operation screen image on a display screen of a display with a finger or a pen such as shown in the Patent Document 1 mentioned below. Further usually, these electronic devices are also provided with a plurality of operation buttons including a power switch button on its housing, and indicating signs relating to these operation buttons is usually provided on a frame portion provided around a display screen of the display in a main body thereof.

In these electronic device as mentioned above, when the power switch button is operated, for example, an operation screen image such as a menu screen image for executing each function is displayed at predetermined positions of the display, and respective function is executed in accordance with the operation by touching a desired operation screen image, that is the menu, for example, with a finger or an input pen by a user.

Patent Document 1: Japanese Laid-Open Patent OPH11-215217

SUMMARY OF THE INVENTION

However, in the conventional electronic devices as described above, the operation screen image such as the menu screen image was always displayed at a predetermined position of the display, so that a user sometimes felt inconvenient upon operating the electronic device. For example, when the operation screen image is displayed on a right end side of the display screen, it is easily operated or touched by a right-handed user, but, in turn, it is difficult for a left-handed user to operate or touch the operation screen image.

Further, if the signs for operation provided on the operation screen image of the display, or on the frame portion are written in Japanese, it is hard to understand the signs for an foreigner who is not good at Japanese, and this may cause erroneous operations.

In addition, the functions given to one electronic device are usually predetermined, and if a user wants to expand the functions of the electronic device, it is necessary to consider to prepare a dedicated apparatus having expanded functions to be connected to the electronic device. This method is not convenient and not easy for a general user, and accordingly it is difficult to easily perform the expansion of functions.

That is, one embodiment of an electronic device according to the present invention performs an improvement in usability by solving the above mentioned problems.

In order to solve the above mentioned problems, the electronic device as one of the embodiment of the present invention is configured to include a main body having a display and a frame portion provided around the display, a frame panel freely detachable to the frame portion of the main body, and a frame detecting unit provided on the main body for detecting a type of the frame panel attached to the frame portion, and thereby a display position of a screen image relating to the operation on the display, or a display function of a screen image relating to the operation on the display is changed in accordance with the detected result of the frame detecting unit.

Accordingly, in this embodiment of the electronic device of the present invention, the display position of the screen image on the display or the display function of the screen image on the display is changed in response to the type of the frame panel attached to the main body.

According to another embodiment of the present invention, the electronic device is configured to include, in order to solve the above problems, a main body having a display and a frame portion provided around the display, a frame panel freely detachable to the main body, and an operation unit provided on the main body for performing a predetermined operation to the main body, wherein sings relating to the operation unit are provided on the frame panel, and the signs relating to the operation unit are different depending on the type of frame panel attached to the main body.

Accordingly, in this embodiment of the present invention, the sign relating to the operation unit is recognized depending on the type of frame panel attached to the main body.

According to another embodiment of the present invention, the electronic device, in order to solve the abovementioned problems, includes a main body having a display and a frame portion provided around the display, and a frame panel freely detachable to the main body, wherein the frame panel includes a function unit having a predetermined function, and the function of the electronic device is changed depending on the type of the frame panel attached to the main body.

Accordingly, in this embodiment of the present invention, a new function is added to the electronic device depending on the type of the frame panel attached to the main body.

As described above, the electronic device of the present invention is configured to include a main body having a display and a frame portion around the display and a frame panel freely attachable to the main body. Further, a frame detecting unit is provided on the main body for detecting a type of a frame panel attached to the main body so that the display position of the screen image relating to the operation on the display or the display function of the screen image relating to the operation on the display is changed by the detected result of the frame detecting unit.

Accordingly, as the display position of the screen image relating to the operation on the display or the display function of the screen image relating to the operation on the display is changed depending on the type of frame panel attached to the main body, it is able to perform an improvement in usability for a user.

According to another embodiment of the present invention, the operation unit for performing a predetermined operation to the main body is provided on the frame panel, even when the frame panel is not attached to the main body, it is possible to keep a good design in an appearance of the main body. Further, it is possible to change an arranging position of the operation unit depending on the type of the attached frame panel, and is possible to perform an improvement in usability by selecting a frame panel having a operation unit at a desired position and by attaching it to the main body.

According to another embodiment of the present invention, the operation unit for performing a predetermined operation to the main body is provided on the main body, so that it is not necessary to provide the operation unit to each frame panel. This attains a reduction of manufacturing cost, and also, it is possible to perform any desired operation to the operation unit even when the frame panel is not attached to the main body, and accordingly, this also performs an improvement in usability.

According to another embodiment of the present invention, the electronic device includes a main body having a display and a frame portion provided around the display, a frame panel freely detachable to the main body, and an operation unit provided on the main body, wherein signs relating to the operation unit are provided on the frame panel, and the signs relating to the operation unit are differed depending on the type of the frame panel attached to the main body.

Accordingly, by selectively attaching a frame panel having a user understandable sign on it to the main body, it is able to perform an improvement in usability.

According to another embodiment of the present invention, the electronic device includes a main body having a display and a frame portion provided around the display, and a frame panel freely detachable to the main body, wherein the frame panel includes a function unit having a predetermined function, and each frame panel has a different function unit depending on the type of the frame panel.

Accordingly, it is able to easily perform an expansion of function by selectively attaching a frame panel having a user desired function unit to the main body.

DETAILED DESCRIPTION OF THE PREFERRED EMBODIMENTS

Hereinafter, one example of an electronic device according to the present invention is described with reference to the attached drawings. In the preferred embodiment, the present invention is applied to a portable type television receiver, for example.

In this case, the scope of the present invention is not limited to such portable television receiver, and the present invention is able to be applied to various electronic devices having displays such as an audio apparatus, an information processing apparatus like a personal computer, a communications apparatus represented by a telephone and a facsimile, an information terminal apparatus like a PDA (Personal Digital Assistant), an imaging apparatus like a digital still camera and a video camera and the like.

Figure 1:
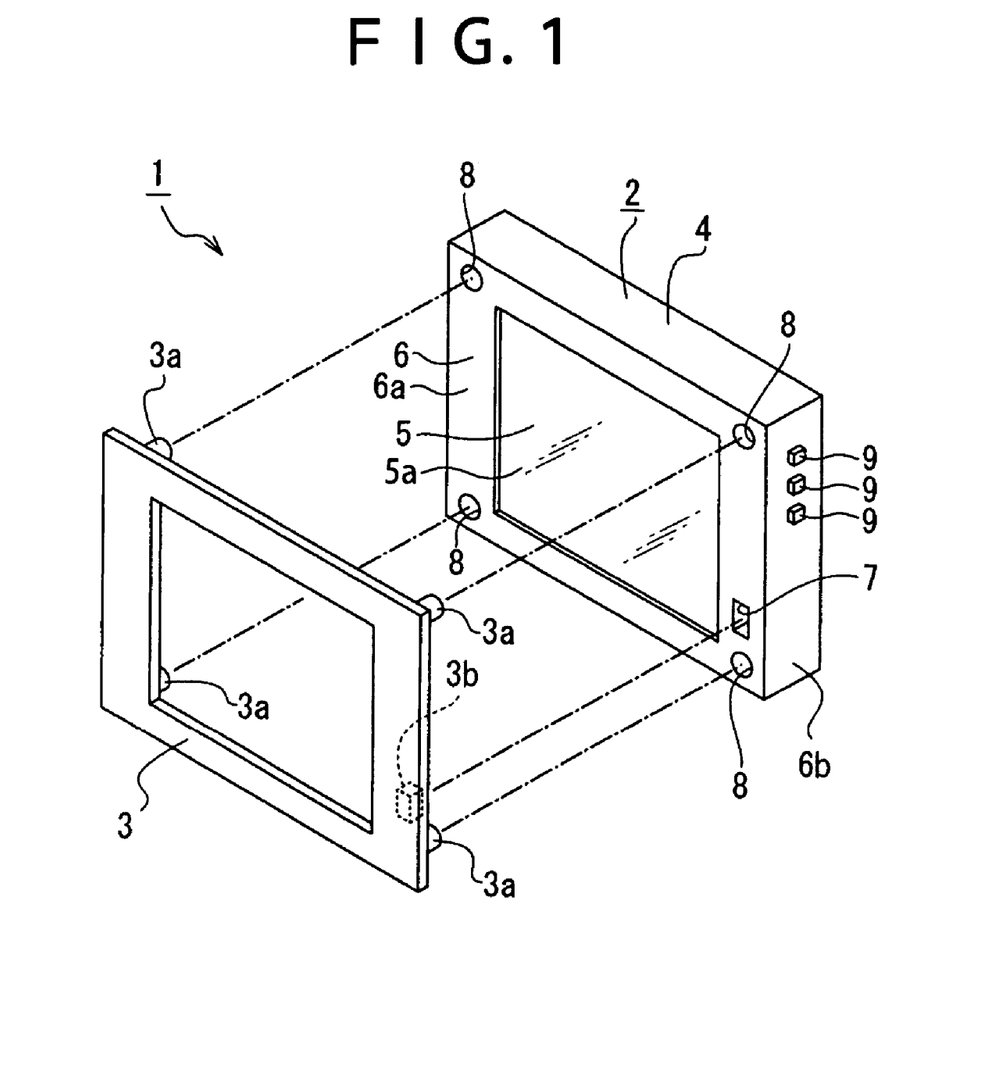
FIG. 1 is a perspective view of an electronic device for carrying out one embodiment of the present invention, wherein a frame panel is separated from a main body.

An electronic device (a portable television receiver, for example) 1 includes a main body 2 and a frame panel 3 which is freely detachable to the main body 2 as shown in FIG. 1.

Further, the main body 2 includes a rectangular shaped main panel 4 and a display 5 provided in front of the main panel 4. On the display 5, a transparent coordinate detecting unit (a touch panel, for example) 5a is installed.

A peripheral portion of the main panel 4 is formed as a frame portion 6. A detection connecting unit 7 is provided at a front portion 6a of the frame portion 6. Further, positioning holes 8 are provided at 4 corners on the front portion 6a of the frame portion 6.

An operation unit 9 is provided at a side surface portion 6b of the frame portion 6. A power switch button for on or off the power of the television receiver, a channel switch for selecting television channels, a volume controller for changing audio volume and the like are provided as the operation unit 9.

The frame panel 3 is formed to be same size and same shape with the frame portion 6, and positioning projections 3a are provided at 4 corners on the back. Each of positioning projections 3a is inserted into each of positioning holes 8 when the frame panel 3 is attached to the frame portion 6, and the frame panel 3 is properly positioned relative to the frame portion 6 by inserting each of the positioning projections 3a into each of the positioning holes 8.

On a back of the frame panel 3, a connector 3b is provided in which the connector 3b is connected to the detection connecting unit 7 when installed on the frame portion 6.

Figure 2:
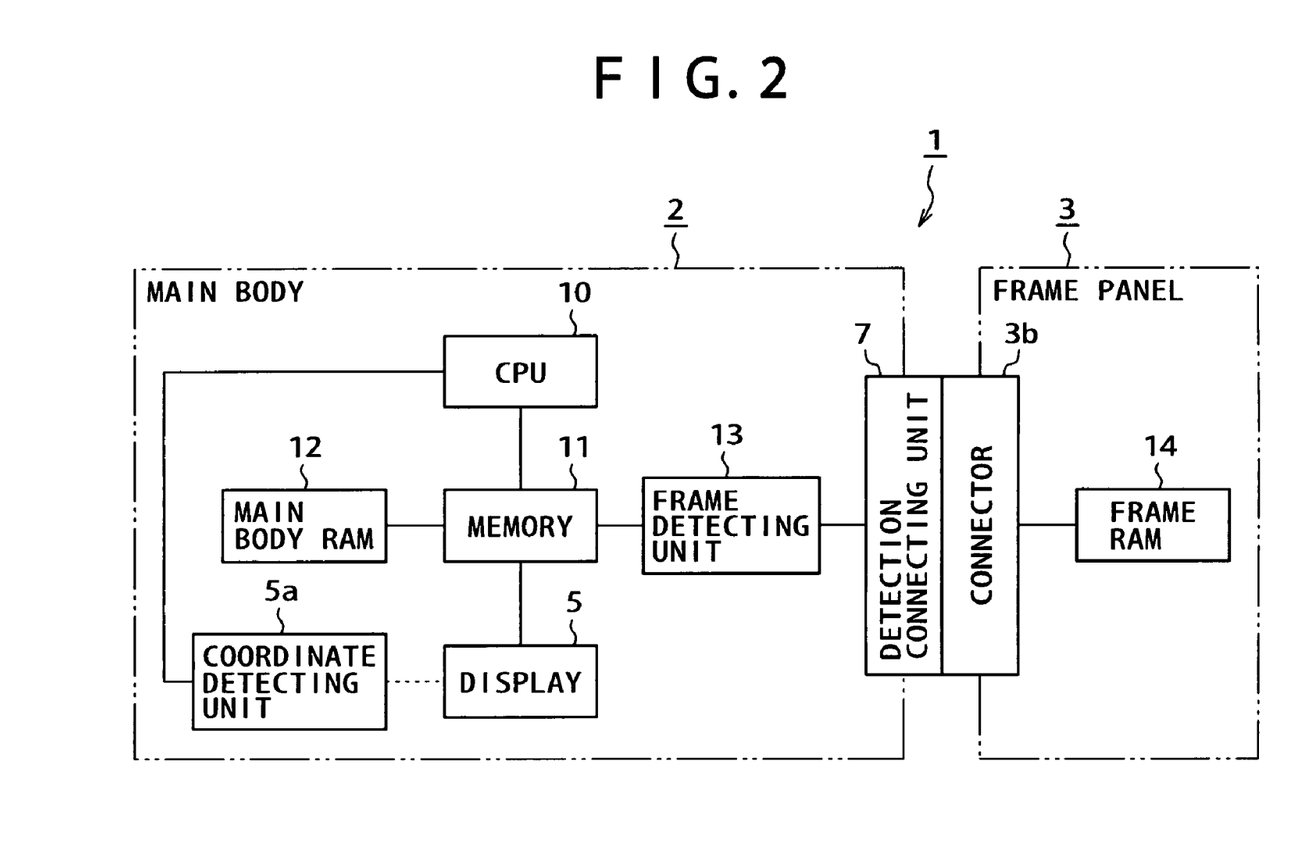
FIG. 2 is a circuit diagram of the main body and the frame panel.

Hereinafter, circuit configurations of the main body 2 and the frame panel 3 depicted in FIG. 2 are described.

A CPU (Central Processing Unit) 10 is provided in the main body 2 as an operational processing unit, and the CPU 10 is connected to a memory 11. The memory 11 is connected to a main body RAM (Random Access Memory) 12, a frame detecting unit 13, and a display 5, and the frame detecting unit 13 is further connected to the detection connecting unit 7 provided at the frame portion 6. The transparent coordinate detecting unit 5a installed on the display 5 is connected to the CPU 10.

The main body RAM 12, for example, stores the data for outputting an operation screen image such as a menu screen image and the like to be displayed on the display 5, and the data is outputted to the memory 11 based on an instruction from the CPU 10.

The frame panel 3 includes a frame RAM 14, and this frame RAM 14 stores the data for displaying on the display 5 an operation screen image such as a menu screen image and the like. The data stored in the frame RAM 14 is different from the data stored in the main body RAM 12. For example, the data stored in the main body RAM 12 is the data to be outputted when a right-handed user operates the electronic device 1, and the data stored in the frame RAM 14 is the data to be outputted when a left-handed user operates the electronic device 1.

The functions to be executed by the electronic device 1 include, for example, an Internet function A, an e-mail function B, an album function C, a TV function D, a video function E, and the like.

The Internet function A and the e-mail function B are, for example, functions similar to the Internet function and the e-mail function generally used with a personal computer, a mobile phone and the like, the album function C is a function capable of storing and displaying images captured by a digital still camera and the like, the TV function D is a function to watch television program, and the video function E is a function capable of displaying video images of a video deck, a disc player and the like located at a remote location by operating a remote controller.

The menu screen image displayed on the display 5 is an operation screen image for executing respective function A, B, C, D, or E, for example. The operation screen image such as the menu screen image for various operations displayed on the display 5 is possible to be operated not only by touching with a finger but also by touching with an input pen, for example. When a touch operation by a finger or an operation by an input pen is done to respective screen image for operation displayed on the display 5, coordinates for the touched portion are detected by the coordinate detecting unit 5a and the detection signal based on the detected result is supplied from the coordinate detecting unit 5a to the CPU 10. The CPU 10 supplies an instruction signal based on the detection signal supplied from the coordinate detecting unit 5a to the memory 11, and the respective function corresponding to the instruction signal is performed by reading out data stored in the memory 11.

Figure 3:
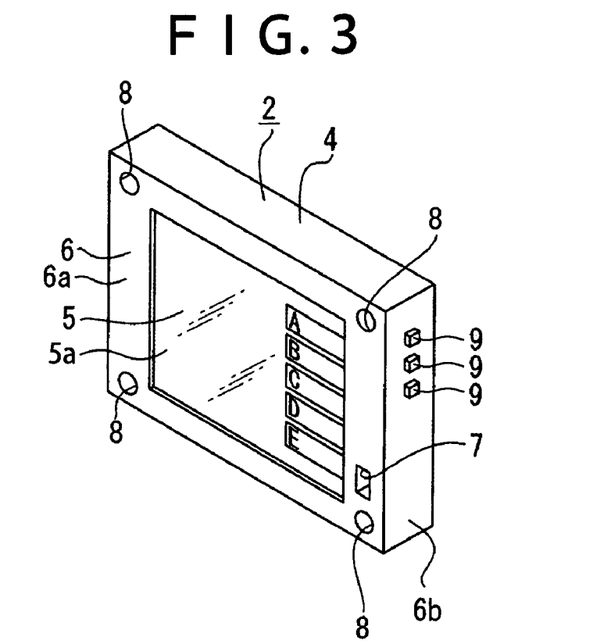
FIG. 3 is a perspective view of the main body display to show a condition of a display where the frame panel is not attached.

When the power switch button (operation unit) 9 is operated in the electronic device 1 without attaching the frame panel 3 to the main body 2, the fact that the frame panel 3 is not attached to the frame portion 6 is detected by the frame detecting unit 13, an instruction signal is outputted from the CPU 10 to the main body RAM 12, and the data stored in the main body RAM 12 is read out and stored in the memory 11. The data thus stored in the memory 11 is outputted to the display 5, and the menu screen images A, B, C, D, and E are displayed on a right end portion of the display 5 as shown in FIG. 3. Thus, the electronic device 1 becomes a condition wherein a user is able to easily operate the electronic device 1 by touching the menu screen images A, B, C, D, and E with a right hand.

Figure 4:
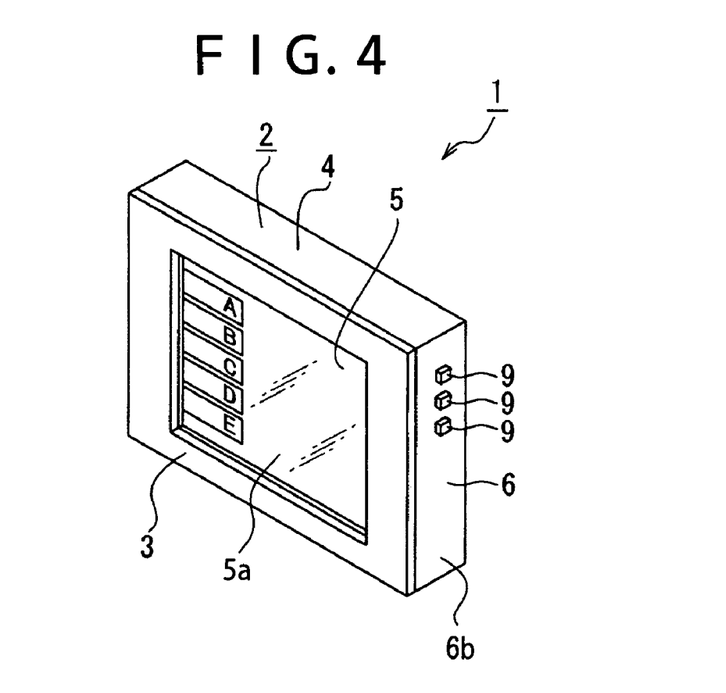
FIG. 4 is a perspective view of a main body display to show another condition of the display where the frame panel is attached.

On the contrary, when the power switch button (operation unit) 9 is operated in the electronic device 1 while attaching the frame panel 3 to the main body 2, the fact that the frame panel 3 is attached to the frame portion 6 is detected, another instruction signal is outputted from the CPU 10 to the frame RAM 14, the data stored in the frame RAM 14 is read out to store in the memory 11. The data stored in the memory 11 is then outputted to the display 5, and the menu screen images A, B, C, D, and E are displayed at a left end portion of the display 5 as shown in FIG. 4. Accordingly, a user is able to easily operate the electronic device 1 by touching with a left hand.

Further in the electronic device 1, another frame panel other than the frame panel 3 is also able to attach to the frame portion 6, wherein data different from the data stored in the main body RAM 12 and the frame RAM 14 are stored in the frame panel, and when this frame panel is attached to the frame portion 6, the menu screen images A, B, C, D, and E may be arranged to be displayed at a top portion, a bottom portion, or a central portion on the display 5, for example.

In the above mentioned embodiment of the present invention, it is described the case where the display position of the menu screen images A, B, C, D, and E are changed between a right end portion and a left end portion on the display 5 in accordance with the attaching or removing of the frame panel 3 to the frame portion 6. However, the menu screen images A, B, C, D, and E may be displayed on the right end portion of the display 5 when a first frame panel is attached to the frame portion 6, and displayed on the left end portion of the display 5 when a second frame panel is attached to the frame portion 6.

Further in the above embodiment, the case where the display image displayed on the display 5 are the menu screen images A, B, C, D, and E is described, but the screen image to be displayed on the display 5 is not limited to the menu screen images A, B, C, D, or E, and the screen image displayed on the display 5 is arbitrary. For example, it may be a thumb-nail screen image, a software keyboard screen image, an image for operation other than a menu screen image, or the like.

Figure 5:
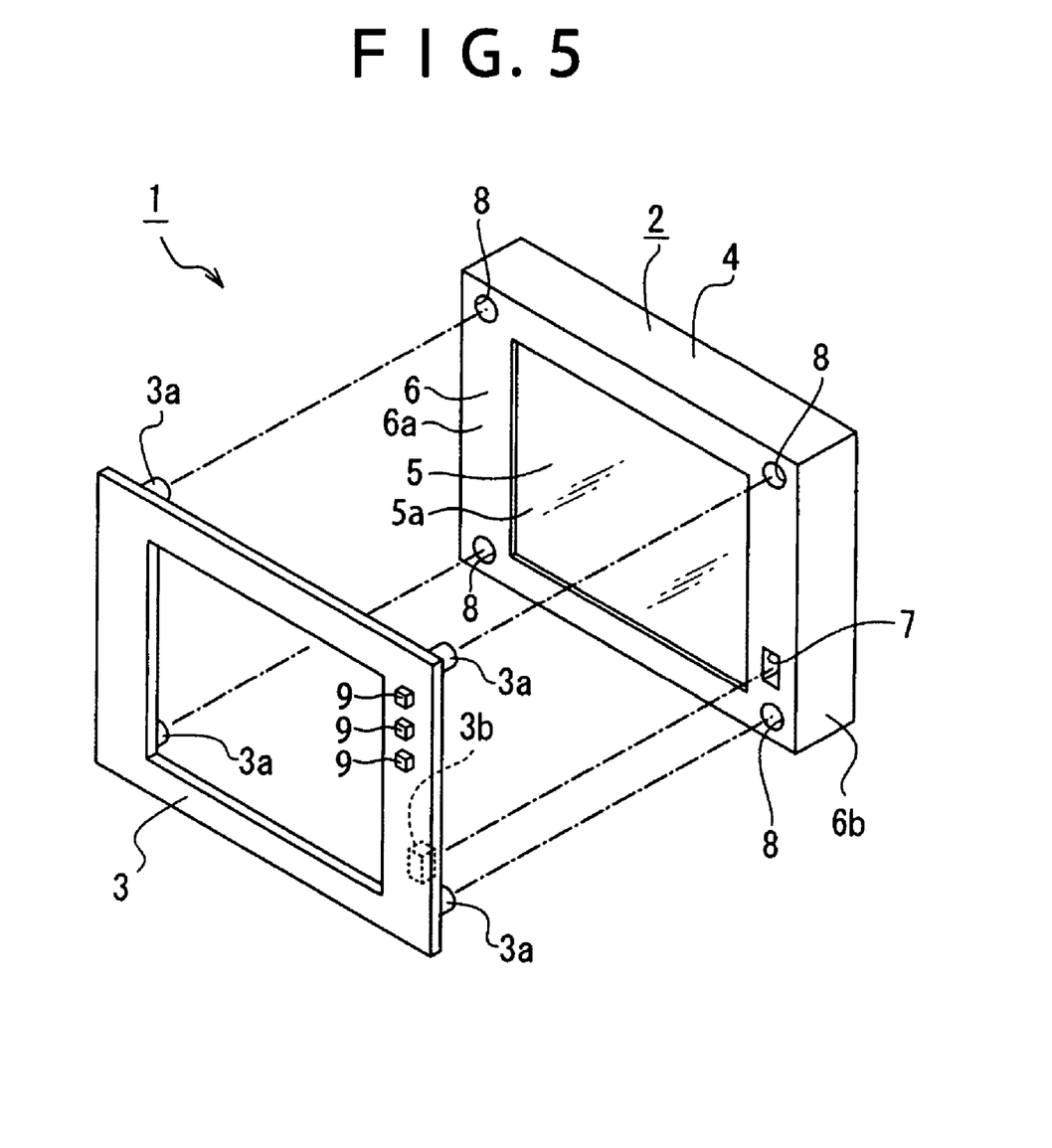
FIG. 5 is a perspective view of an electronic device, wherein the frame panel provided with an operation unit is separated from the main body.

Further in the above-mentioned embodiment, the operation unit 9 is provided on the main body 2, but the operation unit 9 may be provided on each frame panel 3 instead of providing on the main body 2 as shown in FIG. 5. If the operation unit 9 is provided on each frame panel 3, it is preferably configured so that the attaching of the frame panel 3 is detected by the frame detecting unit 13 when the frame panel 3 is attached to the frame portion 6, and the operation unit 9 provided on the frame panel 3 becomes operable.

The operation unit 9 is provided on the frame panel, so that even when the frame panel 3 is not attached to the main body 2, it is possible to keep a good design in an appearance of the main body 2. Further, it is possible to change an arranging position of the operation unit 9 depending on the type of the frame panel 3 attached to the frame portion 6, so that it is also possible to perform an improvement in usability for a user by selecting the frame panel 3 having the operation unit 9 at a desired position for a user and attaching to the frame portion 6.

In this case, if the operation unit 9 is provided on the frame panel 3, it is preferable to display an operation screen image having roles of the power switch button, the channel switch, the volume controller, and the like on the display 5 so that the use of the electronic device 1 is made possible without attaching the frame panel 3 on the main body 2. Further, even the case where the operation unit 9 is provided on the frame panel 3, only the power switch button may be provided on the main body 2 so that it becomes possible to perform a power on/off of the main body 2 by operating the main body 2. Further, it is possible to perform a power on/off of the main body 2 by the operation of the power switch button on the frame panel 3 attached to the main body 2 or by the operation of a remote controller (not shown here).

When the operation unit 9 is provided on the main body 2, it is not necessary to provide the operation unit 9 to each of the frame panel 3, so that a manufacturing cost of the electronic device 1 becomes lower. In addition, even the frame panel 3 is not attached to the frame portion 6, a user is able to operate the operation unit 9, and this performs an improvement in usability.

In the above embodiment, the embodiment where the display position on the display 5 is changed in response to the detected result of the frame detecting unit 13 is described, but the display function on the display 5 may be changed in response to the detected result of the frame detecting unit 13.

As examples of the change of the display functions, there are cases where a displaying language or sign is changed, or sizes of screen images of the displaying menu screen image, the thumb-nail screen image, or the like is changed. When the displaying language is changed to a language which is the mother tongue of the user, this performs an improvement in usability for the user, and when the menu screen image and the like are displayed by enlarging the menu screen image, this also performs an improvement in usability for the user.

Figure 6:
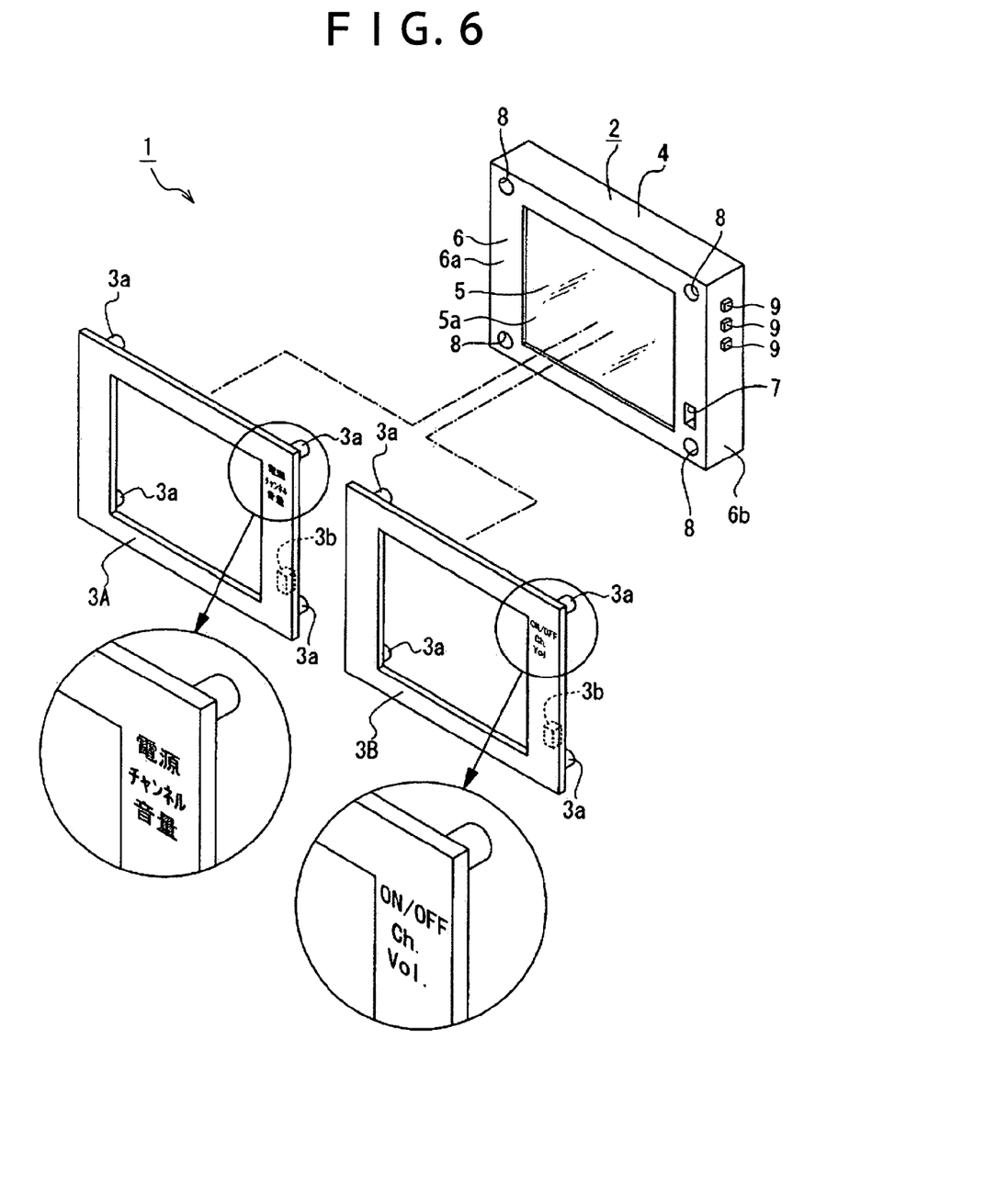
FIG. 6 is a perspective view of the electronic device with different two frame panels wherein the display signs relating to the operation unit of the electronic device is changed by changing the type of the frame panel to be attached.

In the above embodiment, the case wherein the display position or the display function relating to the operation on the display 5 is changed in response to the detected result of the frame detecting unit 13 is described, but hereinafter, a case wherein a display relating to the operation unit 9 is changed by changing the type of the frame panel 3 is described with reference to FIG. 6.

The frame panel 3A has sings of "電源"., "チャンネル",and "音量"written in Japanese with reference to the operation unit 9 of the main body 2.

The frame panel 3B has signs of "On/Off", "Ch.", and "Vol." written in English with reference to the operation unit 9 of the main body 2.

If the frame panel 3A is attached to the frame portion 6, the signs of "電源","チャンネル"., and "音量"written in Japanese are positioned to respective operation unit 9, and if the frame panel 3B is attached to the frame portion 6, the signs of "On/Off", "Ch.", and "Vol." written in English are positioned to respective operation unit 9.

Accordingly, when the frame panel 3A is attached to the frame portion 6, an improvement in usability is expected for a user who is able to understand Japanese, and when the frame panel 3B is attached to the frame portion 6, an improvement in usability is expected for a user who is able to understand English.

As one embodiment of the present invention, the frame panels 3A, 3B each having Japanese sign or English sign are employed, but the frame panel may have a sign of a language other than Japanese and English. Further, a size and a type of font of the displaying language may be arbitrary selected.

Figure 7:
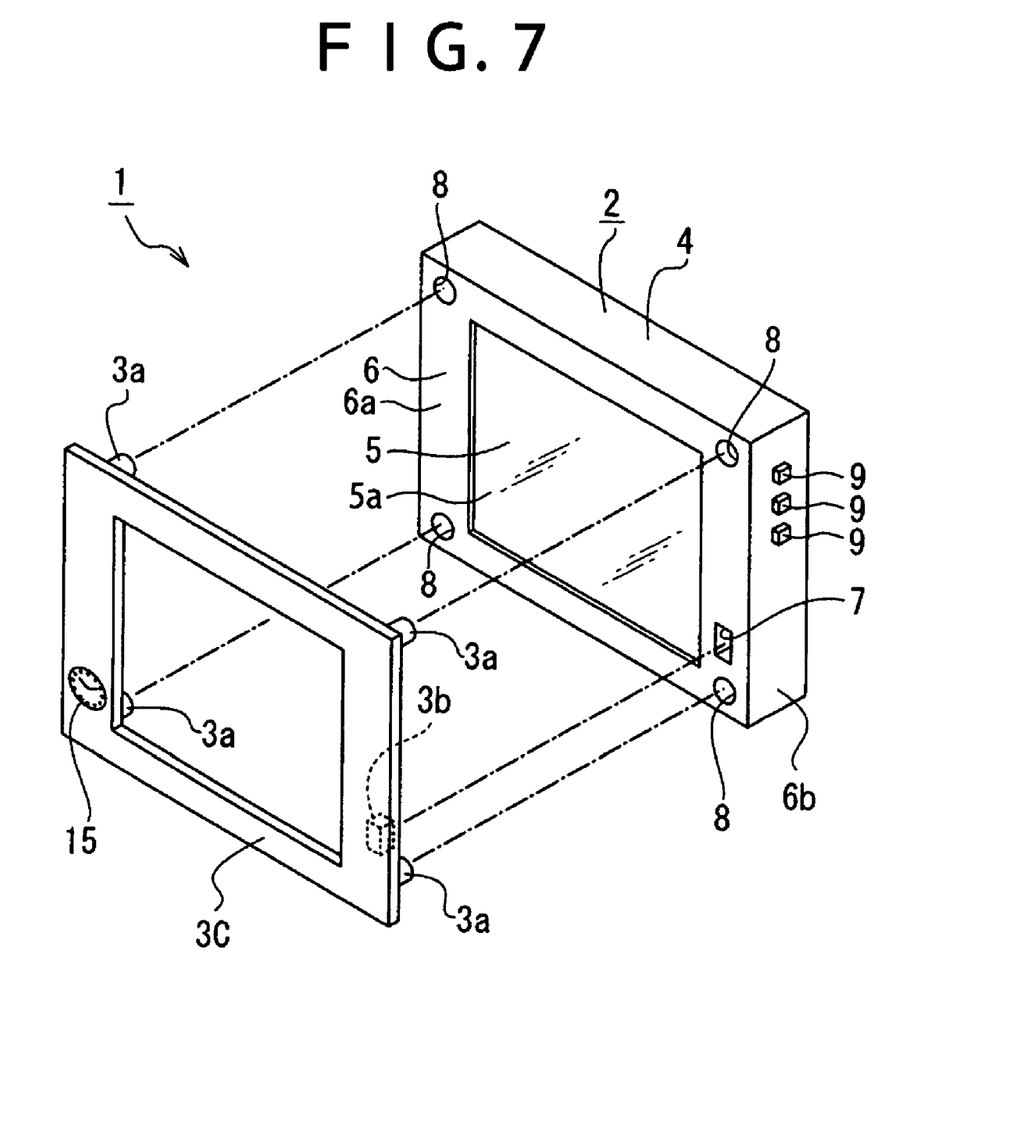
FIG. 7 is a perspective view of the electronic device, wherein a new function is added to the electronic device depending on a type of the attached frame panel.

Further, another case is described wherein the function of the electronic device 1 is changed by replacing the type of the frame panel 3C to be attached to the frame portion 6 as shown in FIG. 7.

The frame panel 3C is provided with a function unit 15 for executing predetermined functions. Various functions such as a speaker function, an illumination function, a radio function, a clock function, a thermometer function, and the like may be functions of the function unit 15. FIG. 7 shows a clock function as one example of the function unit 15.

Accordingly, if the frame panel 3C is attached to the frame portion 6, a function equipped to the function unit 15 of the frame panel 3C are added to the electronic device 1, and like this, a user is able to expand its function by selectively attaching a frame panel 3C having a desired function unit to the frame portion 6.

The specific shapes and configurations of portions depicted and described in the above embodiments are only examples for carrying out the present invention, and the scope of the present invention is not limited by these examples.

What is claimed is:

1. An electronic device comprising:
   a main body having a display and a frame portion provided around the display;
   a frame panel detachable to the frame portion; and
   a frame detecting unit provided in the main body and configured to detect a type of the frame panel attached to the main body,
   wherein the frame panel includes a memory configured to store data relating to operation, the data in the memory being supplied to the main body via a connector when the frame panel is attached to the frame portion, and
   a display position of a screen image relating to the operation on the display, or a display function of a screen image relating to the operation on the display is changed in accordance with the detected result of the frame detecting unit.

2. The electronic device according to claim 1, further comprising:
   an operation unit configured to perform a predetermined operation to the main body, said operation unit located on the frame panel.

3. The electronic device according to claim 2, wherein the operation unit is a clock.

4. The electronic device according to claim 1, further comprising:
   an operation unit configured to perform a predetermined operation to the main body, said operation unit located on the main body.

5. The electronic device according to claim 4, wherein the operation unit is a clock.

6. An electronic device comprising:
   a main body having a display and a frame portion provided around the display;
   a frame panel freely detachable to the main body;
   an operation unit provided on the main body and configured to perform a predetermined operation to the main body; and
   signs relating to the operation unit provided on the frame panel,
   wherein the frame panel includes a memory configured to store data relating to operation, the data in the memory being supplied to the main body via a connector when the frame panel is attached to the frame portion, and
   the signs relating to the operation unit are different depending on a type of a frame panel attached to the main body.

7. The electronic device according to claim 6, wherein the operation unit is a clock.

8. An electronic device comprising:
   a main body having a display and a frame portion provided around the display;
   a frame panel freely detachable to the main body; and
   an operation unit having a predetermined function is provided on the frame panel,
   wherein the frame panel includes a memory configured to store data relating to operation, the data in the memory being supplied to the main body via a connector when the frame panel is attached to the frame portion, and
   the function is different depending on the type of the frame panel attached to the main body.

9. The electronic device according to claim 8, wherein the operation unit is a clock.

* * * * *